(12) United States Patent
Stadnyk et al.

(10) Patent No.: US 12,283,856 B2
(45) Date of Patent: Apr. 22, 2025

(54) COIL FOR MANUFACTURING A POLYPHASE WINDING FOR AN ELECTRICAL MACHINE

(71) Applicant: LIMITED COMPANY (LTD) SCIENTIFIC MANUFACTURING ENTERPRISE "OPTIMAG", Kherson (UA)

(72) Inventors: Ivan Petrovych Stadnyk, Kherson (UA); Vitalii Ruslanovych Harmash, Kherson (UA); Artur Erastovych Borzakov, Kherson (UA)

(73) Assignee: LIMITED COMPANY (LTD) SCIENTIFIC MANUFACTURING ENTERPRISE "OPTIMAG", Kherson (UA)

( * ) Notice: Subject to any disclaimer, the term of this patent is extended or adjusted under 35 U.S.C. 154(b) by 291 days.

(21) Appl. No.: 18/026,400

(22) PCT Filed: Sep. 13, 2021

(86) PCT No.: PCT/UA2021/000078
§ 371 (c)(1),
(2) Date: Mar. 15, 2023

(87) PCT Pub. No.: WO2022/060343
PCT Pub. Date: Mar. 24, 2022

(65) Prior Publication Data
US 2023/0352998 A1 Nov. 2, 2023

(30) Foreign Application Priority Data
Sep. 16, 2020 (UA) ................ a 2020 05940

(51) Int. Cl.
*H02K 3/12* (2006.01)

(52) U.S. Cl.
CPC ........... *H02K 3/12* (2013.01); *H02K 2213/03* (2013.01)

(58) Field of Classification Search
CPC ............................ H02K 3/12; H02K 2213/03
(Continued)

(56) References Cited

U.S. PATENT DOCUMENTS

2011/0241453 A1* 10/2011 Idland .................... H02K 21/24
310/43

FOREIGN PATENT DOCUMENTS

| JP | 2549498 Y2 * | 9/1997 | |
|---|---|---|---|
| KR | 101053921 B1 * | 8/2011 | |
| WO | WO-2013100803 A1 * | 7/2013 | ............. H02K 21/24 |

* cited by examiner

*Primary Examiner* — Jose A Gonzalez Quinones
(74) *Attorney, Agent, or Firm* — Nadya Reingand

(57) ABSTRACT

The technical solution relates to the field of electromechanical engineering and can be used in the manufacture of windings for rotating electrical machines (electric motors and electric generators) with or without slots, or for linear electric motors. A coil for manufacturing a polyphase winding for an electrical machine is made in the shape of an isosceles trapezoid from a self-sintering conductor. The active elements of the coil are straight, and the overhangs of the coil are bent at a right angle to the active elements of the coil and are curved along an arc of a circle in the case of rotating electrical machines or are straight in the case of linear electric motors. The dimensions of the trapezoid are determined by the width of the active element of the coil, the width of a tooth of the core, the thickness of the coil and the acute angle of the trapezoid.

1 Claim, 6 Drawing Sheets

(58) Field of Classification Search
USPC .................................... 310/200, 203, 208
See application file for complete search history.

COIL FOR MANUFACTURING A POLYPHASE WINDING FOR AN ELECTRICAL MACHINE

FIELD OF INVENTION

The invention relates to the electric machine industry and can be used in forming windings of rotating electric machines (electric motors and generators) with a slotted or slotless stator and windings of linear electric motors with a slotted or slotless stator.

BACKGROUND

According to DEST18311-80, the winding of an electric device should be realized as a set of coils, interconnected and arranged in a certain manner, which are designed for generating or utilizing magnetic field. That is, the coil is a part of the winding and is to be used as an individual design unit.

The winding design has an effect on the essential electrical characteristics and mass and dimensions parameters of electric machines.

There are coils for electric machine windings in which the coil is formed in two slots of the electric machine stator by using a to-and-fro method. The deficiency of such coils is that the coil wire is wound disorderly. Due to this, the degree of filling the volume for the coil wire is low.

There are windings which are formed by using coils of two types manufactured by using self-baking wire, that is, so-called straight and oblique coils. The deficiency of such windings is that coils of two types are required for forming the winding.

There are also preformed windings which consist of identical coils shaped, for design reasons, as a trapezium. Each of the coils has active elements and coil ends. The coil of this design allows the coil ends to be positioned in two planes.

The deficiency of such coils is that the coil is formed by using a to-and-fro method. Because of this, the degree of filling the volume for the coil wire is low.

As the nearest analogue of the invention, the toroidal winding coil has been selected. Coils of this type are used in magnetoelectric generators (RU No. 2494520 C2, H02K 21/24, H02K 3/24, H02K 16/02; Oct. 7, 2013). The coil is shaped as an equilateral trapezium, and the coil element at the bottom of the trapezium is bent arc-wise. When forming the winding, the toroidal coils are inserted one inside the other, forming a single module. Between these coils, an additional flat ringed coil shaped as an equilateral trapezium is disposed. The lateral sides of the additional coil are positioned in the same plane between the lateral sides of the other toroidal coils. Electric current flows through each of the coils. As there are three coils in a module, it is possible for the electric generator to generate three-phase current.

The disadvantage of the nearest analogue of the invention is that coils of two types are required for forming the winding. The coils are assembled for forming a module which is to be filled with epoxide compound. For this reason, the winding manufacturing process is complicated.

SUMMARY

The purpose of the invention is to design a general-purpose winding coil that is suitable for use in polyphase, specifically three-phase, windings of rotating electric machines and linear electric motors, and, as a result, to provide a higher degree of filling the volume for the coil wire and to simplify the winding assembly process.

This purpose is achieved by that the coil for forming the polyphase winding of an electric machine is shaped as an equilateral trapezium and is manufactured by using self-baking wire. The active elements of the coil are straight, the coil ends are positioned at right angle relative to the active coil elements and are bent arc-wise, for rotating electric machines, or are straight, for linear electric motors, and the trapezium dimensions are determined depending on the width of the coil active element (h), the width of the magnet core tooth ($h_t$), the coil thickness (d), and the acute angle of the trapezium ($\alpha$), where $$\alpha = \arccos\left(\frac{d}{2(h+h_t)}\right),$$

$d < 2(h+h_t)$, $h_t=0$ for the slotless winding design, and the distance between the active coil elements is $2h+3h_t$.

Accordingly, this coil shape allows similar coils to be firmly interconnected. The windings formed by connecting the coils according to the invention can be used in rotating electric machines (electric motors and generators) with a slotted or slotless stator, as well as in linear electric motors with a slotted or slotless stator.

The shape of the coil according to the invention provides the possibility to densely stow the coil ends so that the space for the coil ends can be filled with copper conducting wire down to the limit. As a result, the overall motor dimensions can be reduced at the specified motor power, or the motor power can be increased at the specified overall motor dimensions.

The advantage of the engineering solution according to the invention consists in improving the functional characteristics of winding coils due to the possibility to use coils of the same type in windings of rotating electric machines (electric motors and generators) with a slotted or slotless stator, as well as in windings of linear electric motors with a slotted or slotless stator, in simplifying the winding assembly process, and in increasing the winding density. As a result, the overall motor dimensions can be reduced at the specified motor power.

BRIEF DESCRIPTION OF THE DRAWINGS

For a more complete understanding of the present invention, reference is made to the following figures.

DETAILED DESCRIPTION OF THE PREFERRED EMBODIMENT

The coil for the polyphase winding of a rotating electric machine or a linear motor should be manufactured by performing the operations specified below.

Figure 1:
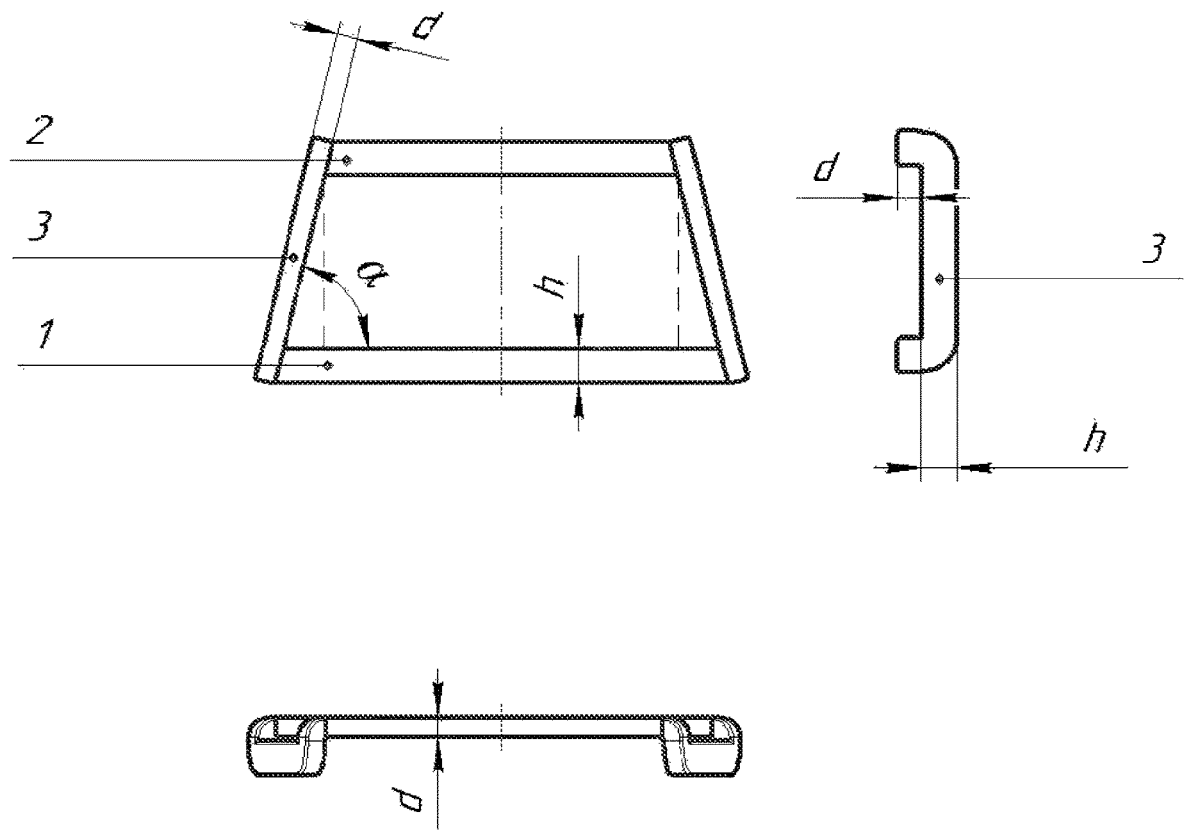
FIG. 1 is the illustration of the coil for linear motors, where 1 denotes the active element of the coil of larger length; 2 denotes the active element of the coil of less length; 3 denotes the coil end.
Figure 2:
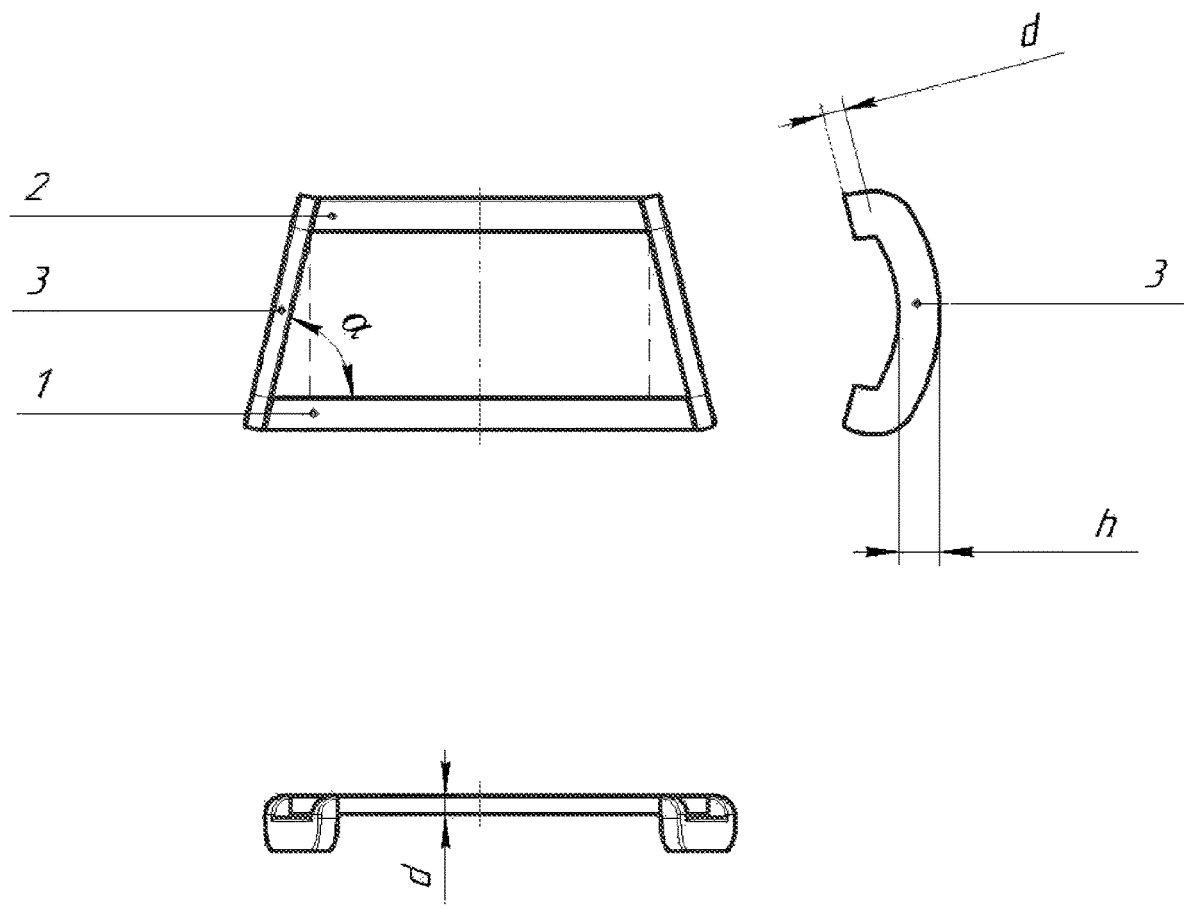
FIG. 2 is the illustration of the coil for electric machines.
Figure 3:
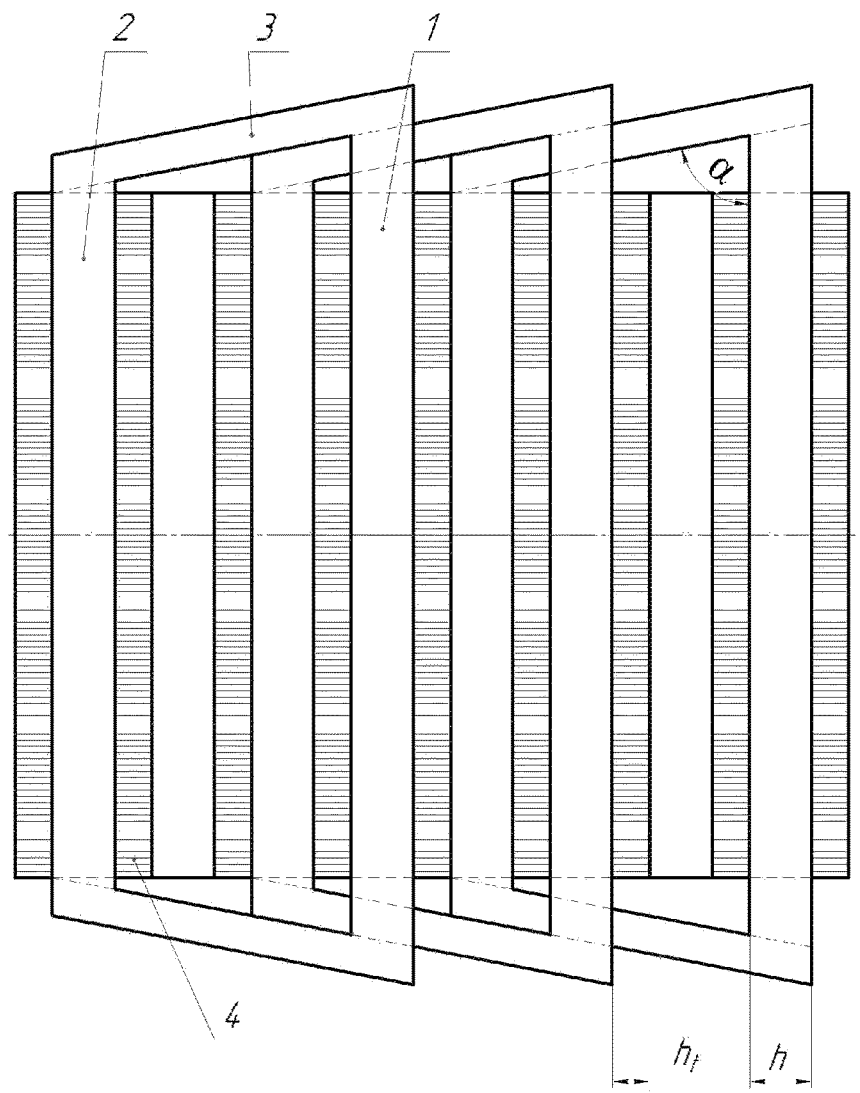
FIG. 3 is the diagram of the winding for linear motors with a slotted stator according to FIG. 1 (one coil for each phase), where 4 denotes the motor stator.
Figure 3:
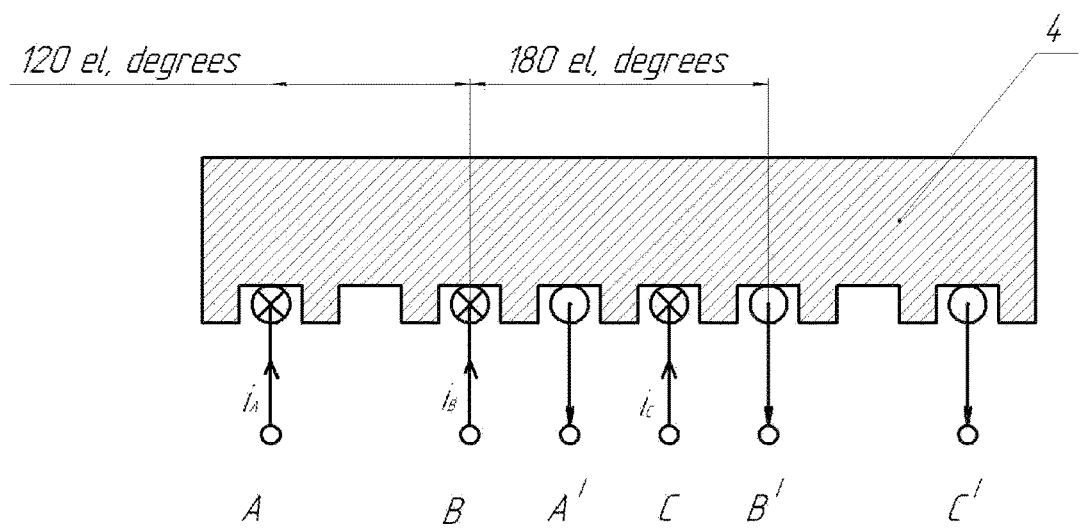
Figure 4:
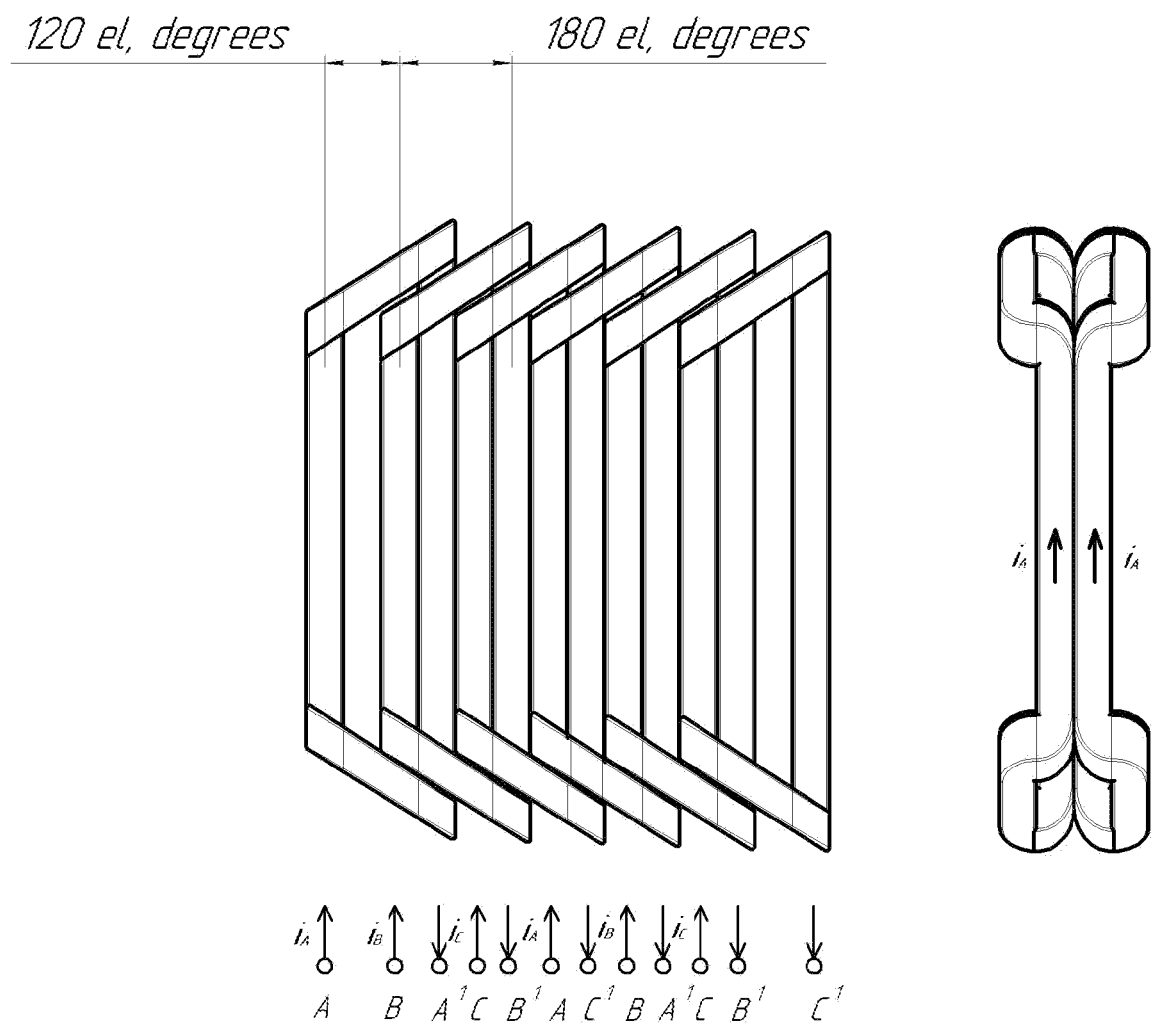
FIG. 4 is the diagram of the winding for three-phase linear motors without a magnetic core in the moving part of the motor. The winding consists of two identical coils.
Figure 5:
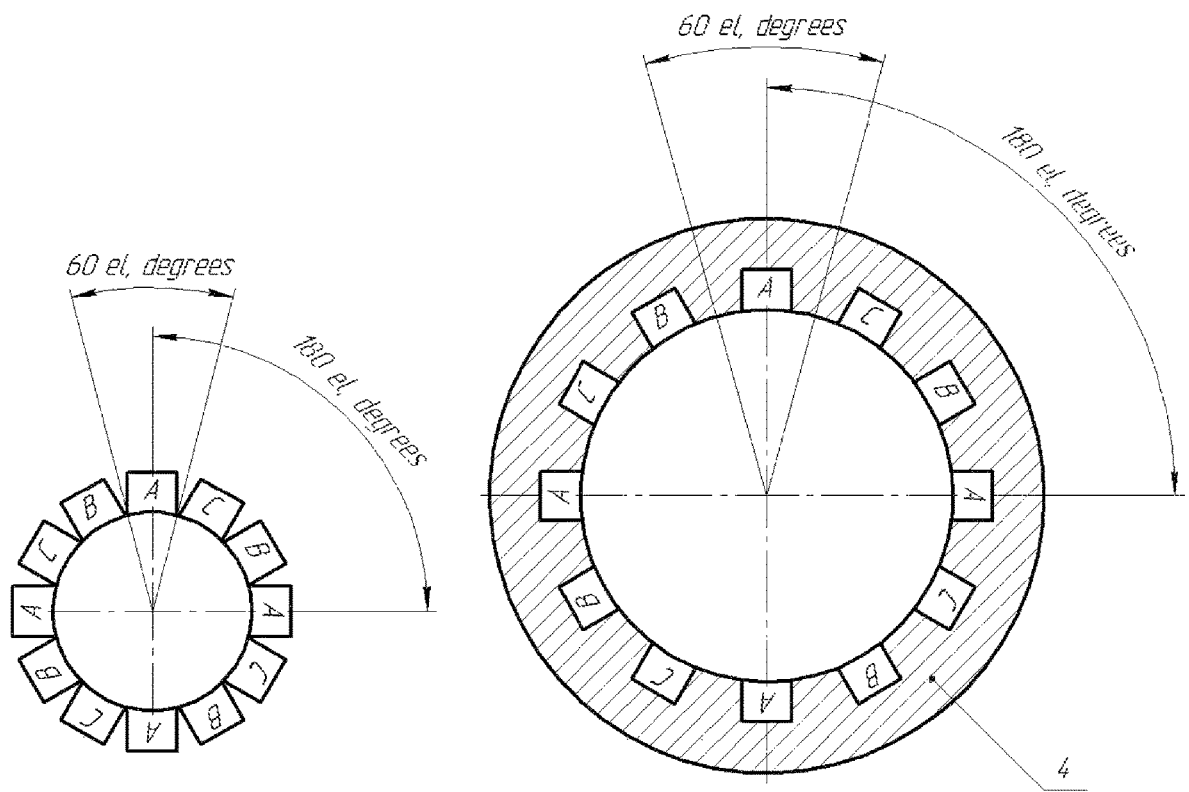
FIG. 5 is the diagram of the winding for rotating electric machines.
Figure 6:
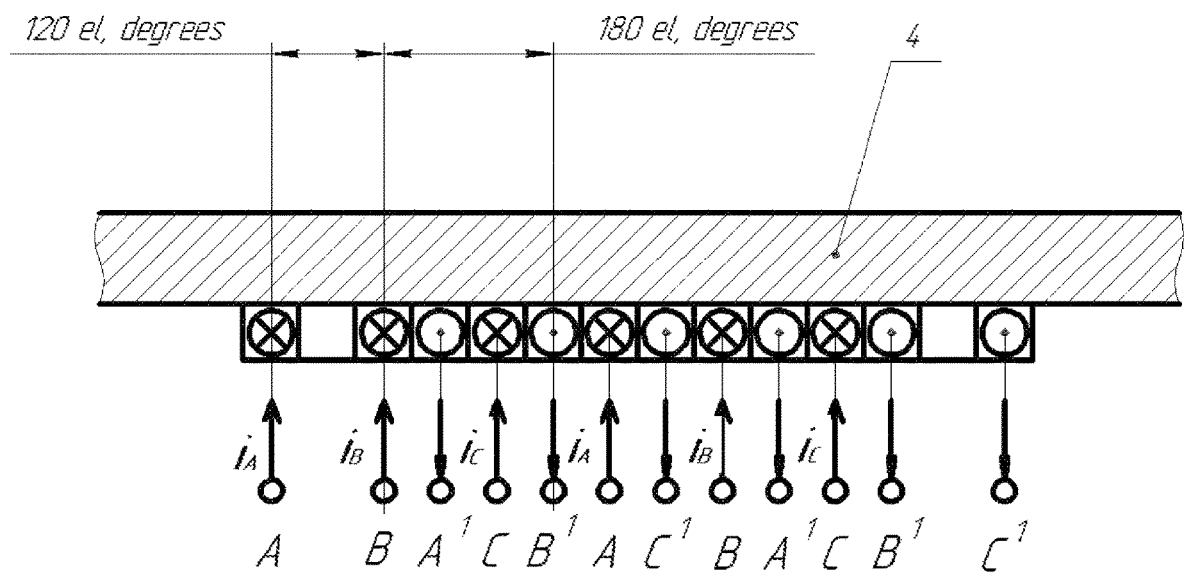
FIG. 6 is the expanded cross element of the winding for the slotless stator of a three-phase electric machine.

After the preformed winding of copper self-baking wire and corresponding shaping of the wire according to the specified parameters, the wire should be baked for forming the coil ready for use. Active elements 1 and 2 of the coil should be straight, and coil ends 3 should be arranged at right angle relative to the active elements of the coil and bent ark-wise, for rotating electric machines (see FIG. 2), or should be straight, for linear motors (see FIG. 1). The trapezium dimensions are determined depending on the width of the coil active element (h), the width of the magnet core tooth ($h_t$), the coil thickness (d), and the acute angle of the trapezium ($\alpha$), where $$\alpha = \arccos\left(\frac{d}{2(h + h_t)}\right),$$

d<2(h+$h_t$), $h_t$=0 for slotless winding design, and the distance between the active coil elements is 2h+3$h_t$.

The coils according to the invention should be used as follows.

To form the winding, it is necessary to connect the completed coils of each phase in series, in parallel, or in serial-parallel. For the coil of any phase, two active elements of the corresponding coils of the other phases should be positioned between the active elements of the coil. The total number of the coils should be a multiple of three.

For rotating electric machines, the width of the active element of the coil (h) and the width of the magnet core tooth ($h_t$) should satisfy the condition $$h + h_t = \frac{\pi R}{N},$$

where R is the radius of the stator bore; N is the total number of the coils.

For linear motors without steel elements in the moving part of the motor, the winding should be formed by using two identical coils so that the coil ends of each of the coils are interconnected and point in opposite directions.

After forming the three-phase winding, it is necessary to assemble the motor completely. In the case of a rotating electric motor, the motor rotor should be inserted into the stator. In the case of a linear motor, the stationary part of the motor (magnets fixed to the magnetic core) should be installed. When the motor is assembled, it is ready for three-phase voltage supply.

In the case of an electric generator, the generator rotor should be driven by an external power unit in order to generate three-phase voltage.

The invention claimed is:

1. A coil for forming a polyphase winding of an electric machine, comprising: the coil being designed in a shape of an equilateral trapezium and manufactured using a self-baking wire, wherein active elements of the coil are straight, coil ends are positioned at right angle relative to the active coil elements and are bent arc-wise for rotating electric machines, or are straight for linear electric motors, and trapezium dimensions are determined depending on a width of the coil active element (h), a width of a magnet core tooth ($h_t$), a coil thickness (d), and an acute angle of the trapezium ($\alpha$), where $$\alpha = \arccos\left(\frac{d}{2(h + h_t)}\right),$$

d<2(h+$h_t$), $h_t$=0 for slotless winding design, and a distance between the active coil elements is 2h+3$h_t$.

* * * * *